United States Patent
Hong et al.

(10) Patent No.: US 7,434,260 B2
(45) Date of Patent: Oct. 7, 2008

(54) METHOD FOR DETECTING MALICIOUS CODE PATTERNS IN CONSIDERATION OF CONTROL AND DATA FLOWS

(75) Inventors: Man-Pyo Hong, Seongnam (KR); Sung-Wook Lee, Suwon (KR); Si-Haeng Cho, Seoul (KR)

(73) Assignee: Ajou University Industry Cooperation Foundation, Gyeonggi Do (KR)

( * ) Notice: Subject to any disclaimer, the term of this patent is extended or adjusted under 35 U.S.C. 154(b) by 608 days.

(21) Appl. No.: 10/799,527

(22) Filed: Mar. 12, 2004

(65) Prior Publication Data

US 2004/0181684 A1    Sep. 16, 2004

(30) Foreign Application Priority Data

Mar. 14, 2003    (KR) ................ 10-2003-0016209

(51) Int. Cl.
*G06F 11/00* (2006.01)
(52) U.S. Cl. ............... 726/22; 713/187; 726/26
(58) Field of Classification Search ............. 726/22–25; 713/188; 714/38
See application file for complete search history.

(56) References Cited

U.S. PATENT DOCUMENTS

| | | | | |
|---|---|---|---|---|
| 4,843,545 | A * | 6/1989 | Kikuchi | 717/155 |
| 5,937,196 | A * | 8/1999 | Schmidt et al. | 717/155 |
| 6,697,950 | B1 * | 2/2004 | Ko | 726/24 |
| 7,185,327 | B2 * | 2/2007 | Scales | 717/155 |
| 2003/0159090 | A1 | 8/2003 | Wray et al. | |
| 2004/0205411 | A1 * | 10/2004 | Hong et al. | 714/38 |
| 2005/0108562 | A1 * | 5/2005 | Khazan et al. | 713/200 |
| 2006/0026675 | A1 * | 2/2006 | Cai et al. | 726/22 |

OTHER PUBLICATIONS

Wagner, David and Dean, Drew. Intrusion Detection via static Analysis. 2001 Proceedings of the IEEE Symposium on security and Privacy. 2001 IEEE pp. 156-168.*

* cited by examiner

*Primary Examiner*—Nasser Moazzami
*Assistant Examiner*—Fikremariam Yalew
(74) *Attorney, Agent, or Firm*—Dilworth & Barrese, LLP.

(57) ABSTRACT

The present invention relates to a method for detecting malicious code patterns in consideration of control and data flows. In the method of the present invention, a malicious code pattern is detected by determining whether values of tokens (variables or constants) included in two sentences to be examined will be identical to each other during execution of the sentences, and the determination on whether the values of the tokens will be identical to each other during the execution is made through classification into four cases: a case where both tokens in two sentences are constants, a case where one of tokens of two sentences is a constant and the other token is a variable, a case where both tokens of two sentences are variables and have the same name and range, and a case where both tokens of two sentences are variables but do not have the same name and range. According to the present invention, it is possible to exclude a false positive error that may occur in conventional comparison of variable names and to lower a false negative error rate, thereby improving the accuracy of detection of malicious behaviors.

13 Claims, 5 Drawing Sheets

FIG. 1

```
Set fso = CreateObject("Scripting.FileSystemObject")

Set dirsystem = fso.getSpecialFolder(1)

Set c = fso.GetFile(WScript.ScriptFullName)

c.Copy(dirsystem&"\LOVE-LETTER-FOR-YOU.TXT.VBS")

set out = WScript.CreateObject("Outlook.Application")

set male = out.CreateItem(0)

male.Attatchments.Add(dirsystem&"\LOVE-LETTER-FOR-YOU.TXT.VBS")

male.send
```

FIG. 2

```
set c = fso.GetFile(WScript.ScriptFullName)
:::
set c = fso.GetFile( 'test.txt ')              //COMPLETE OPERATION USING VARIABLE C
c.Copy( LOVE-LETTER-FOR-YOU.TXT.VBS )           //DEFINE NEW VALUE OF C
```

FIG. 3

```
set c = fso.GetFile(WScript.ScriptFullName)
d = c
d.Copy( LOVE-LETTER-FOR-YOU.TXT.VBS )
```

```
S1 : a = 0
S2 : If a > 0 then
S3 :    b = 1
S4 :    c = 2
S5 : End If
S6 : d = 3
```

METHOD FOR DETECTING MALICIOUS CODE PATTERNS IN CONSIDERATION OF CONTROL AND DATA FLOWS

BACKGROUND OF THE INVENTION

1. Field of the Invention

The present invention relates to a method for detecting malicious code patterns present in malicious scripts, and more particularly, to a method for detecting malicious code patterns by using a static analysis in consideration of control and data flows.

2. Description of the Prior Art

Generally, as for detection of malicious scripts, techniques for binary codes are used directly or some modifications can be made thereto to be adapted to scripts in the form of source programs. Particularly, signature recognition through scanning is a malicious-code detection scheme that is being most commonly used. This scheme has an advantage in that a diagnosis speed is high and the kind of malicious code can be clearly identified since it determines whether a concerned code is a malicious code by searching for a special character string present in only one malicious code. However, this scheme has a problem in that it cannot cope with unknown malicious codes at all.

Meanwhile, it is a heuristic analytical technique that is considered the most practical one among techniques for detecting unknown malicious scripts. This technique is a scheme for detecting malicious codes by organizing code segments frequently used as malicious codes into a database and scanning target codes to determine whether the target codes are present or how many times the target codes appear. Although this scheme has advantages of a relatively high speed and a high detection ratio, it has a disadvantage of a somewhat high possibility of the occurrence of a false positive error. Accordingly, in order to alleviate such a disadvantage, there has been proposed a method for detecting malicious scripts using a static analysis. Since this method checks not only the presence of method sequences but also associated parameters and return values, it represents considerably precise detection results as compared with a method using a simple heuristic analysis.

FIG. 1 shows an example of malicious visual basic script codes, explaining the concept of a method for detecting malicious scripts using a static analysis. As can be seen in FIG. 1, in order that a plurality of method calls constitutes one malicious behavior, a special relationship between their parameters and return values is inevitably required. For example, Copy method at the fourth line copies a script under execution to make a file with the name of "LOVE-LETTER-FOR-YOU.TXT.VBS" and "Attachments.Add" method at the seventh line attaches the file to a newly created mail object to achieve self-replication through a mail. However, in a case where a scheme for checking only the presence of method calls is used, even though there is an unrelated method call for creating a script file named "A" and attaching a file named "B" to the created script file, the method call is regarded as a malicious code, which exhibits a high false positive error rate. On the contrary, the detection method using the static analysis can obtain more precise detection results than methods using a simple search of character strings, by checking not only whether method calls are present but also whether all relevant values such as used file names, for example, "fso," "c," "out," "male" or the like, are found.

However, the detection method using the static analysis has still a problem in view of detection accuracy. Conventional detection methods using the static analysis compare only revealed names of variables with each other. Therefore, there may be an error that only for the reasons that given two variables have the same name, the values of the two variables are regarded as the same even during execution. FIG. 2 shows an example in which a false positive error may occur in the detection method using the static analysis. In the conventional detection methods using the static analysis, it is only confirmed that variables "c" used at the first and fourth lines are same, and the values of the two variables are regarded as being identical to each other. However, when the program is analyzed, it can be seen that since variable "c" is newly defined at the third line, variables "c" at the first and fourth lines have different values upon actual execution, respectively. Contrary to FIG. 2, FIG. 3 shows an example in which a false negative error may occur in the detection methods using the static analysis. In the conventional methods using the static analysis, since variable "c" at the first line and variable "d" at the third line are different variables, it is determined that the values of the two variables are not same. However, the values of the two variables become identical to each other due to a replication statement "d=c" at the second row upon actual execution. Consequently, in view of the detection of entire malicious behavior patterns, the two types of errors mentioned above induce the false positive and negative errors, respectively. Therefore, there is a need for a method for solving these errors.

SUMMARY OF THE INVENTION

Accordingly, the present invention is conceived to solve the problems in the prior art. An object of the present invention is to provide a method for detecting malicious code patterns, which can improve detection accuracy by using a static analysis in consideration of control and data flows.

According to the present invention for achieving the object, there is provided a method for detecting malicious code patterns in consideration of control and data flows, wherein a malicious code pattern is detected by determining whether values of tokens (variables or constants) included in two sentences to be examined will be identical to each other during execution of the sentences, and the determination on whether the values of the tokens will be identical to each other during the execution is made through classification into four cases: a case where both tokens in two sentences are constants, a case where one of tokens of two sentences is a constant and the other token is a variable, a case where both tokens of two sentences are variables and have the same name and range, and a case where both tokens of two sentences are variables but do not have the same name and range.

Preferably, the determination on whether the values of tokens will be identical during the execution of the sentences is made based on: if both the tokens in the two sentences are constants, whether relevant token character strings are identical to each other; if one of the tokens of the two sentences is a constant and the other token is a variable, whether the relevant token character strings are identical to each other after the variable is substituted for a constant; if both the tokens of the two sentences are variables and have the same name and range, whether there are definitions of the relevant variables in a control flow from a preceding one of the two sentences to a following one thereof; and if both the tokens of two sentences are variables but do not have the same name and range, whether there are definitions of the relevant variables in a control flow from a preceding one of the two sentences to a following one thereof after the relevant variables are substituted for original variables.

BRIEF DESCRIPTION OF THE DRAWINGS

The above and other objects, features and advantages of the present invention will become apparent from the following detailed description of a preferred embodiment given in conjunction with the accompanying drawings, in which:

FIG. 1 shows an example of visual basic script codes performing self-replication through a mail, explaining the concept of a method for detecting malicious scripts using a static analysis;

FIG. 2 shows an example of a false positive error occurred in the method for detecting the malicious scripts using the static analysis;

FIG. 3 shows an example of a false negative error occurred in the method for detecting the malicious scripts using the static analysis;

DESCRIPTION OF THE PREFERRED EMBODIMENTS

Hereinafter, the present invention will be described in detail with reference to the accompanying drawings.

Figure 4:
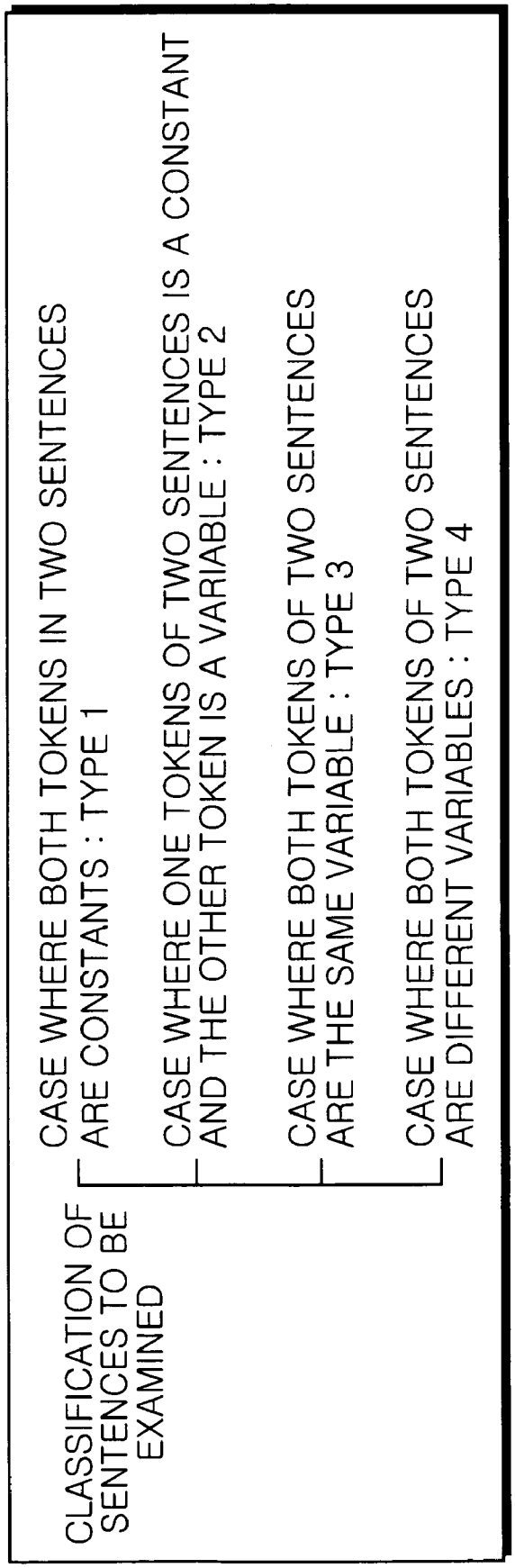
FIG. 4 is a conceptual view of classification of sentences to be examined for detecting malicious code patterns according to the present invention.

FIG. 4 is a conceptual view of classification of sentences to be examined for detecting malicious code patterns according to the present invention, wherein the malicious code patterns are detected by determining whether the values of tokens (variables or constants) included in two sentences to be examined will be identical to each other during execution of the sentences. In other words, the malicious code patterns can be detected by determining, based on codes before execution, whether a variable or constant Ti included in sentence Si and a variable or constant Tj included in sentence Sj have the same value at the time of execution.

As shown in FIG. 4, whether two variables or constants present in a script have the same value can be examined according to the following four cases: a case where both tokens in two sentences are constants (hereinafter, referred to as "Type 1"), a case where one of tokens of two sentences is a constant and the other token is a variable (hereinafter, referred to as "Type 2"), a case where both tokens of two sentences are variables and have the same name and range (hereinafter, referred to as "Type 3"), and a case where both tokens of two sentences are variables but do not have the same name and range (hereinafter, referred to as "Type 4").

Considering the respective types, Type 1 determines whether the values of tokens will be identical to each other during execution based on whether relevant token character strings are identical to each other. Type 2 cannot know, through a code analysis before execution, whether the values of tokens will be identical to each other at the time of execution. Accordingly, when a relevant variable is substituted for a constant by performing constant propagation, it is determined whether the values of tokens will be identical to each other at the time of execution based on whether relevant token character strings are identical to each other.

Type 3 determines whether there are definitions of relevant variables in a control flow from a preceding one of the two sentences to a following one thereof. Here, if there is no variable definition, it is determined that both the variables always have the same value. Type 4 determines whether there are definitions of relevant variables in a control flow from a preceding one of the two sentences to a following one thereof by performing copy propagation for substituting original variables for relevant variables. T this time, if there is no variable definition, it is determined that both the variables always have the same value.

Meanwhile, the definition of a variable means a sentence for substituting a value for a relevant variable as known in program language theories. The constant propagation, which is a technique widely used for a data flow analysis, aims at finding a variable or formula that will always have a specific constant value upon execution of a program, and propagating these the constant value toward program codes as many as possible. Similarly, the copy propagation refers to a technique for reducing the number of copies by finding a variable, which will always have a specific constant value upon execution of a program, and performing substitution through a copy sentence in the form of "x=y". That is, if there is a copy sentence s in the form of "x=y," the following conditions should be satisfied to substitute y for a use u of x and remove the copy sentence s:

i) The copy sentence s should be a unique definition of x that reaches u.

ii) The definition of y should not be present for all paths from s to u.

For example, assume the following program codes:

x=y
z=fso.getfile(x)

Figure 5:
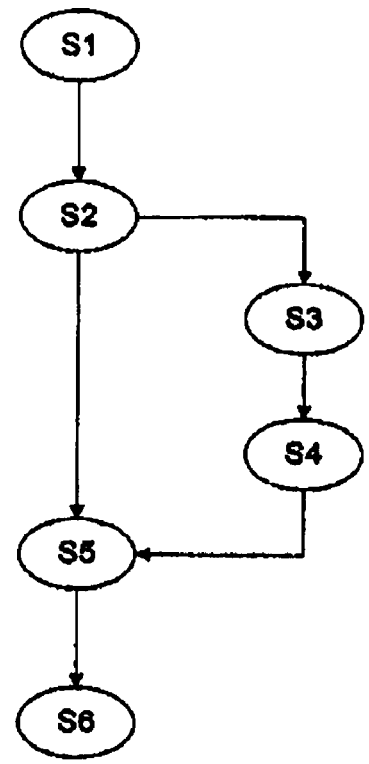
FIG. 5 shows an example of a control flow graph according to present invention.

The second sentence can be changed to "z=fso.getfile(y)." If such a change is a unique use of variable x, the first sentence "x=y" can be deleted. These can be achieved by a repetitive algorithm for obtaining a use and a definition related to variable copy for each basic block and propagating information along a control flow graph. The basic block means a series of sentences having a single entrance point and a single exit point on a control flow and becomes a node of the control flow graph. The presence of a control flow from one basic block to another basic block is expressed as an edge of the control flow graph. FIG. 5 shows an example of such a control flow graph. When a control flow graph is given, a set for use in calculation of effective copy for reaching one basic block is defined as follows:

in[B]=Effective copy up to a preceding node of basic block B, out[B]=Effective copy immediately after execution of basic block B, c_gen[B]=Copy defined in basic block B, and c_kill[B]=Copy invalidated due to new definition in basic block B.

At this time, in[B] and out[B] can be calculated based on the following formulas:

$$in[B] = \bigcap_{P_a \text{ predecessor of } B} out[P], \quad :B \quad (1)$$

$$in[B_1] = \emptyset, \quad (2)$$

$$out[B] = c\_gen[B] \cup (in[B] - c\_kill[B]) \quad (3)$$

After the constant propagation and copy propagation have been performed, it can be seen that the values of relevant variables will be identical to each other. In other words, both of two tokens have the same constant or the same variable name and range, and definitions of the relevant variables should not be present between two sentences in which the tokens are placed.

Meanwhile, when token Ti included in sentence Si and token Tj included in sentence Sj are the same variable or constant V, an algorithm for checking them using a control flow graph G obtained from a script is as follows. That is, in a first step, determination is made so that W:={Si}, IsEqual:=true and IsLinked:=false, where W is a work list, IsEqual is a flag informs that two values are same, and IsLinked is a flag informs that there is a control flow between two nodes. In a second step, a node is taken out from W and then designated as "c." If there is no node to be taken out, the procedure proceeds to a fifth step.

Subsequently, in a third step, if V is a variable, c is a definition of variable V and a path to Sj is present, IsEqual:=false. Otherwise, if c is sentence Sj, IsLinked:=true. If c is not a program termination node or a node that has been already visited, all linked nodes are put into W. A fourth step proceeds to the second step in order to consecutively perform checking. Finally, in the fifth step, it is determined that the variables or constants V in Si and Sj have the same value if slinked=true and IsEqual=true.

In the third step of the algorithm described above, the fact that "c is the definition of variable V" means one of the following cases:

i) c is an assignment statement and variable V is in the left side, and ii) c is a sentence for calling a function or procedure and variable V belongs to set MAY_DEF(p) of relevant function call p.

Here, set MAY_DEF(P) is a set of global variables and reference parameters, which can be defined in procedure p. This set can be obtained as a union of global variables defined in each procedure, actual parameters given as a reference form upon calling and set MAY_DEF called by a relevant procedure. Therefore, this set can be calculated simply. In other words, most of calculation can be performed in advance base on only global variables and a call graph defined in each procedure. Thus, when a procedure call appears during a search of a path between two sentences, only set MAY_DEF is referred to without a search of details of a relevant procedure, thereby greatly shortening analysis time.

Figure 6:
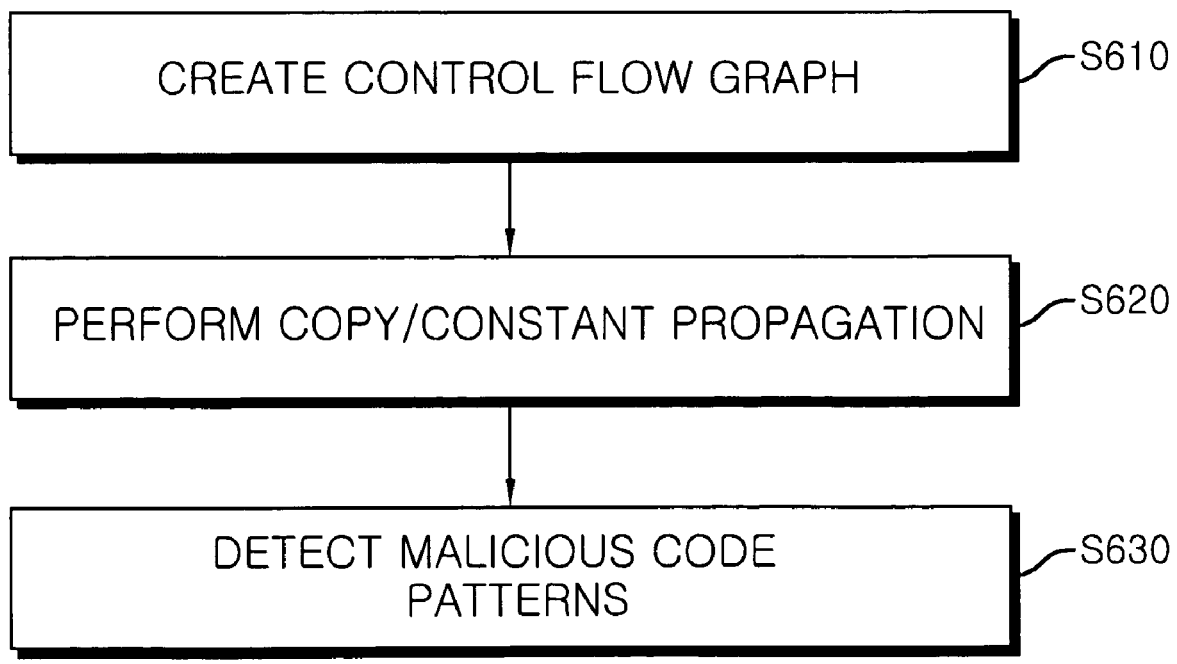
FIG. 6 is a flowchart illustrating detection of the malicious code patterns according to the present invention.

Consequently, a procedure shown in FIG. 6 is required to perform the checking described above. Referring to the figure, a given script is read out to create a control flow graph (S610). Subsequently, the copy/constant propagation is performed through a data flow analysis in the created control flow graph (S620). At this time, the results of the copy/constant propagation become a modified script or a new control flow graph corresponding to the modified script. Finally, malicious code pattern detection is performed (S630). At this time, when it is determined whether the values of two tokens present in two sentences will be identical to each other during execution, the aforementioned algorithm is used by utilizing the control flow graph obtained in step S620.

According to the method for detecting malicious code patterns in consideration of control and data flows described above, it is possible to exclude a false positive error that may occur in conventional comparison of variable names and to lower a false negative error rate, thereby improving the accuracy of detection of malicious behaviors.

What is claimed is:

1. A method for detecting malicious code patterns using a static analysis in consideration of control and data flows, the method comprising: determining whether the values of tokens in two sentences of program code have the same value at the time of execution by:

(a) determining, during execution, if both of the tokens of respective macro operations in the two sentences are constants for each block within a control flow graph and if said determination is true, further determining whether relevant token character strings are identical to each other;

(b) determining if one of the tokens of a macro operation in the two sentences is a constant and the other token of a respective macro operation is a variable, and if said determination is true, further determining whether the relevant token character strings are identical to each other after the variable is substituted for the constant by performing a constant propagation and if said determination is true, detecting said malicious code pattern;

(c) determining if both of the tokens in the two sentences are variables and have the same name and range, and if said determination is true, further determining whether there are definitions of the relevant variables in a control flow from a preceding one of the two sentences to a following one thereof by performing a copy propagation and if said determination is true, detecting said malicious code pattern;

(d) determining if both of the two tokens of the two sentences are variables but do not have the same name and range, and if said determination is true, further determining whether there are definitions of the relevant variables in a control flow from a preceding one of the two sentences to a following one thereof after the relevant variables are substituted for the original variables by performing a copy propagation and if said further determination is true, detecting said malicious code pattern.

2. The method of claim 1, wherein said determining step (d) of determining whether there are definitions of the relevant variables in a control flow from a preceding one of the two sentences to a following one thereof after the relevant variables are substituted for the original variables, further comprises performing a copy propagation to substitute relevant variables for original variables.

3. The method of claim 2, wherein said copy propagation reduces the number of copies by finding a variable which will always have a specific constant value upon execution of a program and performing substitution through a copy sentence in the form of "x=y".

4. The method of claim 3, wherein the copy propagation is performed via a data flow analysis in a created control graph to create a modified control graph.

5. The method of claim 1, wherein said determining step (b) of determining whether there are definitions of the relevant variables in a control flow from a preceding one of the two sentences to a following one thereof further comprises performing a constant propagation to substitute relevant variables for original variables.

6. The method of claim 5, wherein said constant propagation finds a variable or formula that will always have a specific constant value upon execution of a program.

7. The method of claim 5, wherein the constant propagation is performed via a data flow analysis in a created control graph to create a modified control graph.

8. A method for detecting malicious code patterns using a static analysis in consideration of control and data flows, the method comprising: determining whether the values of tokens in two sentences of program code have the same value at the time of execution by:

(a) determining, during execution, if both of the tokens of respective macro operations in the two sentences are constants for each block within a control flow graph and if said determination is true, further determining whether relevant token character strings are identical to each other;

(b) determining if one of the tokens of a macro operation in the two sentences is a constant and the other token of a respective macro operation is a variable, and if said determination is true, further determining whether the relevant token character strings are identical to each other after the variable is substituted for the constant by performing a constant propagation and if said determination is true, detecting said malicious code pattern;

(c) determining if both of the tokens in the two sentences are variables and have the same name and range, and if said determination is true, further determining whether there are definitions of the relevant variables in a control flow from a preceding one of the two sentences to a following one thereof by performing a copy propagation and if said determination is true, detecting said malicious code pattern;

(d) determining if both of the two tokens of the two sentences are variables but do not have the same name and range, and if said determination is true, further determining whether there are definitions of the relevant variables in a control flow from a preceding one of the two sentences to a following one thereof after the relevant variables are substituted for the original variables by performing a copy propagation to substitute relevant variables for original variables and if said further determination is true, detecting said malicious code pattern.

9. The method of claim 8, wherein said copy propagation reduces the number of copies by finding a variable which will always have a specific constant value upon execution of a program and performing substitution through a copy sentence in the form of "x=y".

10. The method of claim 8, wherein the copy propagation is performed via a data flow analysis in a created control graph to create a modified control graph.

11. The method of claim 8, wherein said determining step (b) of determining whether there are definitions of the relevant variables in a control flow from a preceding one of the two sentences to a following one thereof further comprises performing a constant propagation to substitute relevant variables for original variables.

12. The method of claim 11, wherein said constant propagation finds a variable or formula that will always have a specific constant value upon execution of a program.

13. The method of claim 11, wherein the constant propagation is performed via a data flow analysis in a created control graph to create a modified control graph.

* * * * *